US012200045B2

(12) United States Patent
Kono

(10) Patent No.: US 12,200,045 B2
(45) Date of Patent: Jan. 14, 2025

(54) INFORMATION PROCESSING APPARATUS, METHOD OF CONTROLLING INFORMATION PROCESSING APPARATUS, AND STORAGE MEDIUM

(71) Applicant: Canon Kabushiki Kaisha, Tokyo (JP)

(72) Inventor: Masahiko Kono, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/363,038

(22) Filed: Aug. 1, 2023

(65) Prior Publication Data

US 2024/0089314 A1 Mar. 14, 2024

(30) Foreign Application Priority Data

Sep. 8, 2022 (JP) ................. 2022-143097

(51) Int. Cl.
*H04L 67/10* (2022.01)
*G06F 3/04883* (2022.01)
*G06F 3/04886* (2022.01)
*G06T 13/80* (2011.01)

(52) U.S. Cl.
CPC .......... *H04L 67/10* (2013.01); *G06F 3/04883* (2013.01); *G06F 3/04886* (2013.01); *G06T 13/80* (2013.01); *G06F 2203/04808* (2013.01)

(58) Field of Classification Search
CPC ..................................................... H04L 67/10
See application file for complete search history.

(56) References Cited

U.S. PATENT DOCUMENTS

| 10,002,115 | B1 * | 6/2018 | Killian | G06F 16/9577 |
| 2014/0344658 | A1 * | 11/2014 | Srinivasan | G06F 40/279 715/205 |
| 2017/0090734 | A1 * | 3/2017 | Fitzpatrick | G06F 3/0486 |
| 2018/0253500 | A1 * | 9/2018 | Ranjan | G06F 40/14 |
| 2018/0307508 | A1 * | 10/2018 | Banerjee | G06F 9/452 |
| 2020/0036844 | A1 * | 1/2020 | Judd | H04N 1/00411 |

FOREIGN PATENT DOCUMENTS

| JP | 2015-038782 A | 2/2015 | |
| WO | WO-2015172228 A1 * | 11/2015 | G06F 16/958 |
| WO | WO-2019184572 A1 * | 10/2019 | G06F 16/957 |

* cited by examiner

*Primary Examiner* — Philip C Lee
(74) *Attorney, Agent, or Firm* — Venable LLP

(57) ABSTRACT

An information processing apparatus that communicates with a virtual machine functioning as a cloud browser, the information processing apparatus comprising: an acquisition unit configured to acquire, from the virtual machine, analysis information obtained by analyzing HTML data by the virtual machine; a determination unit configured to determine a user operation on a screen of the information processing apparatus using the analysis information; and a drawing unit configured to, when determined that the user operation is a predetermined user operation, execute a drawing process corresponding to an event corresponding to the user operation without acquiring information regarding the drawing process corresponding to the user operation from the virtual machine.

5 Claims, 7 Drawing Sheets

INFORMATION PROCESSING APPARATUS, METHOD OF CONTROLLING INFORMATION PROCESSING APPARATUS, AND STORAGE MEDIUM

BACKGROUND OF THE INVENTION

Field of the Invention

The present invention relates to a method of controlling an information processing apparatus, and a storage medium.

Description of the Related Art

A technique for drawing (rendering) a screen using HTML (https://html.spec.whatwg.org) is known. An application that processes HTML is called a browser, and performs drawing in accordance with the HTML specification.

In recent years, it has become possible to execute an application on a cloud service, where a device at hand of a user transmits operation information of the user to the application on the cloud service, and the device receives a processing result of the application and displays the processing result to the user.

The cloud browser is a browser executed on the cloud service. The device transmits a URL designated by the user or an operation of the user on a touch panel display to the cloud browser, receives a drawing result from the cloud browser, and displays the drawing result on the display.

However, since the device and the cloud browser perform network communication, the processing becomes slow in a low-speed network. On the other hand, Japanese Patent Laid-Open No. 2015-038782 discloses that position information of widgets constituting a screen is received in advance, information necessary for updating is acquired for a widget having a cursor, and updating is performed on the client side.

However, in Japanese Patent Laid-Open No. 2015-038782, the information necessary for updating the widget is acquired by network communication after the cursor enters the widget, and thus the first update takes time in a low-speed network. Therefore, there is a problem that a delay may occur in the display to the user.

SUMMARY OF THE INVENTION

The present invention has been made in view of the above problems, and provides a technique for reducing delay in the display to the user.

According to one aspect of the present invention, there is provided an information processing apparatus that communicates with a virtual machine functioning as a cloud browser, the information processing apparatus comprising: an acquisition unit configured to acquire, from the virtual machine, analysis information obtained by analyzing HTML data by the virtual machine; a determination unit configured to determine a user operation on a screen of the information processing apparatus using the analysis information; and a drawing unit configured to, when determined that the user operation is a predetermined user operation, execute a drawing process corresponding to an event corresponding to the user operation without acquiring information regarding the drawing process corresponding to the user operation from the virtual machine.

Further features of the present invention will become apparent from the following description of exemplary embodiments (with reference to the attached drawings).

DESCRIPTION OF THE EMBODIMENTS

Figure 1:
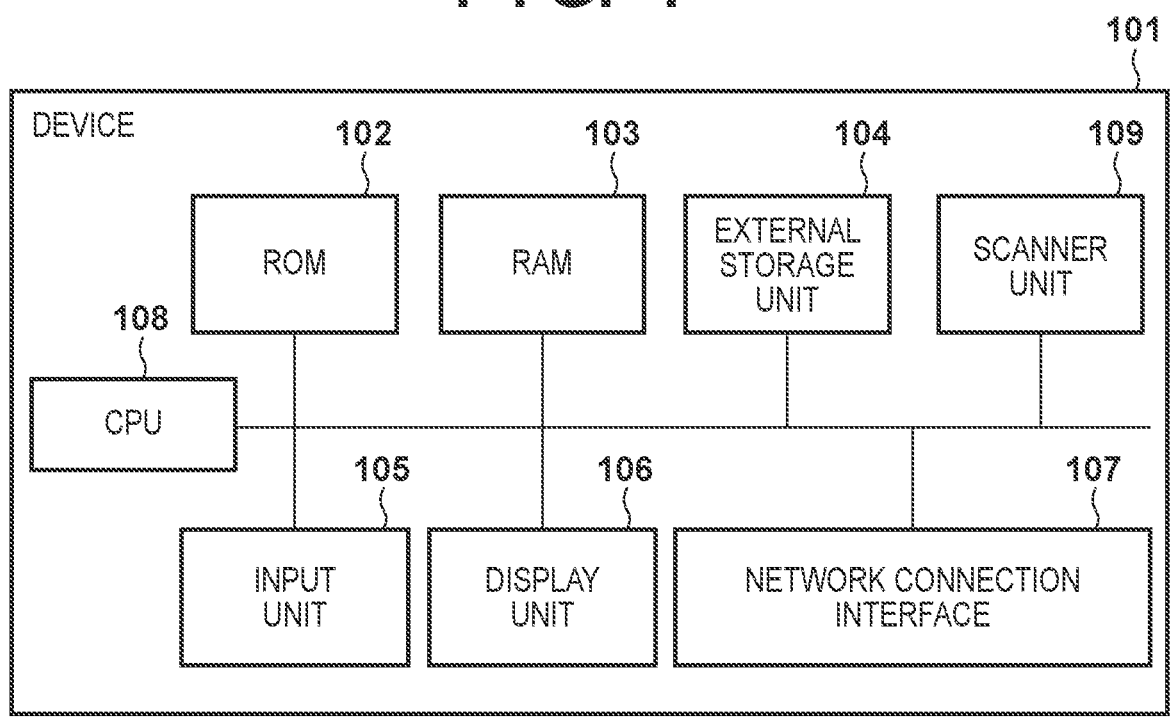
FIG. 1 is a diagram illustrating a configuration example of a device (information processing apparatus) according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

In the present embodiment, an example will be described in which a user operation is determined on a device, and in a case where the user operation is determined to be a predetermined user operation, a drawing process is performed without acquiring information regarding the drawing process from a cloud browser.

<Configuration of Device>

FIG. 1 is a diagram illustrating a configuration example of a device (information processing apparatus) according to an embodiment. A device 101 is, for example, an information processing apparatus such as a multifunction peripheral (MFP), a printer, or a scanner. The device 101 includes a ROM 102, a RAM 103, an external storage unit 104, an input unit 105, a display unit 106, a network connection interface 107, a CPU 108, and a scanner unit 109.

The CPU 108 is one or more CPUs, that is, a control unit, and controls the entire apparatus. The ROM 102 stores a control program of the CPU and various fixed data. The RAM 103 includes an SRAM, a DRAM, and the like, and stores a program control variable and the like. Various setting parameters and various work buffers are also stored in the RAM 103. The external storage unit 104 is configured by a hard disk or the like, and stores file data such as documents and images.

The input unit 105 includes a keyboard, a touch panel, and the like, and an operator can perform various input operations using the input unit 105. The display unit 106 is a liquid crystal display (LCD), a light-emitting diode (LED), or the like, and displays various types of information to the operator or notifies the operator. The network connection interface 107 is an interface for connecting to a network. Examples of the connection method include LAN and USB. The scanner unit 109 scans content.

The configuration illustrated in FIG. 1 shows a part of the device 101 according to the present embodiment, and a copy unit, a printer unit, a modem, a speaker, and the like may be added to the configuration of the apparatus depending on the apparatus. In addition, in a case where the present embodiment is realized by software or the like, each component does not necessarily need to be included in the apparatus.

<Configuration of Virtual Machine>

Figure 4:
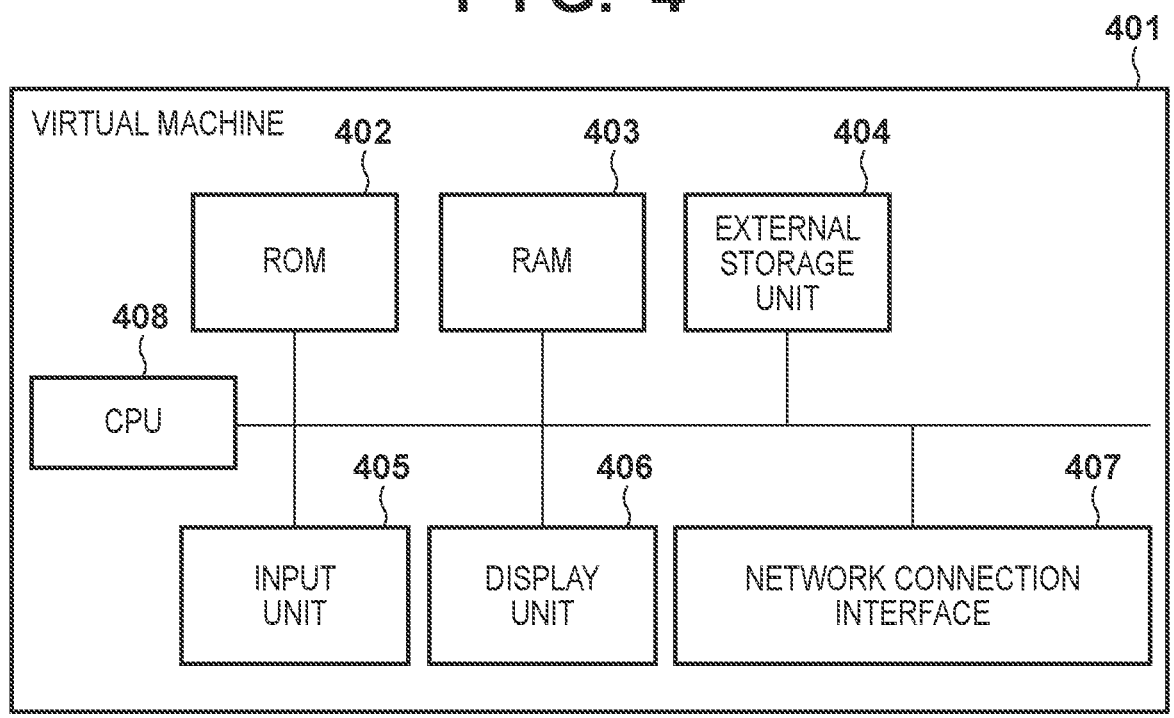
FIG. 4 is a diagram illustrating a configuration example of a virtual machine functioning as a cloud browser according to the embodiment.

FIG. 4 is a diagram illustrating a configuration example of a virtual machine functioning as a cloud browser according to the embodiment. A virtual machine 401 is executed on a cloud service. The virtual machine 401 includes a ROM 402, a RAM 403, an external storage unit 404, an input unit 405, a display unit 406, a network connection interface 407, and a CPU 408.

The cloud browser is executed on the virtual machine 401. The virtual machine 401 acquires the HTML data based on the URL designated via the network connection interface 407, and outputs a result of processing the HTML data to the RAM 403 as a drawing result.

The CPU 408 is one or more CPUs, that is, a control unit, and controls the entire apparatus. The ROM 402 stores a control program of the CPU and various fixed data. The RAM 403 includes an SRAM, a DRAM, and the like, and stores a program control variable and the like. Various setting parameters and various work buffers are also stored in the RAM 403.

The external storage unit 404 is configured by a hard disk or the like, and stores file data such as documents and images. The input unit 405 includes a keyboard, a touch panel, and the like, and an operator can perform various input operations using the input unit 105. The display unit 406 is a liquid crystal display (LCD), a light-emitting diode (LED), or the like, and displays various types of information to the operator or notifies the operator. The network connection interface 407 is an interface for connecting to a network. Examples of the connection method include LAN and USB.

The configuration illustrated in FIG. 4 shows a part of the virtual machine 401 according to the present embodiment, and a copy unit, a printer unit, a modem, a speaker, and the like may be added to the configuration of the apparatus depending on the apparatus. In addition, in a case where the present embodiment is realized by software or the like, each component does not necessarily need to be included in the apparatus.

Processing

Next, with reference to the sequence diagram of FIG. 2, a procedure of processes performed by an information processing system including the device and the virtual machine according to the present embodiment will be described.

First, the user performs an operation via the UI drawn by the device 101. When the user presses a "browser" button on the device 101 during the operation, the CPU 108 starts the process (S201). Specifically, the cloud browser is activated. The CPU 108 transmits an initially set URL to the virtual machine 401 functioning as a cloud browser via the network connection interface 107 (S202). The virtual machine 401 acquires HTML data corresponding to the URL on the cloud service (S203). The virtual machine 401 converts the HTML data into a DOM format (https://dom.spec.whatwg.org/) having a tree structure.

Then, the virtual machine 401 analyzes the elements along the tree structure (S204). Now, an operation of an analyzing process will be described with reference to the flowchart of FIG. 7. The virtual machine 401 acquires attributes of the elements (S701). In the present embodiment, a draggable attribute is acquired as an attribute of an element.

The virtual machine 401 determines whether the draggable attribute is true (S702). If true, the process proceeds to S703. On the other hand, if not true, the process proceeds to S706. In HTML, an element whose draggable attribute is true is a draggable element.

The virtual machine 401 calculates region information as analysis information obtained by analyzing the HTML data by calculating the position, width, and height of a region occupied by the draggable element with respect to the drawing result (S703). The region information is region information indicating a region for accepting user operation on the screen. More specifically, it is information for specifying a region including an element (HTML element) having a predetermined attribute (here, draggable attribute). Furthermore, the region information may be described by a free curve. The virtual machine 401 stores the region information in the RAM 403 (S704). The region is stored for each element whose draggable attribute is true.

Figure 7:
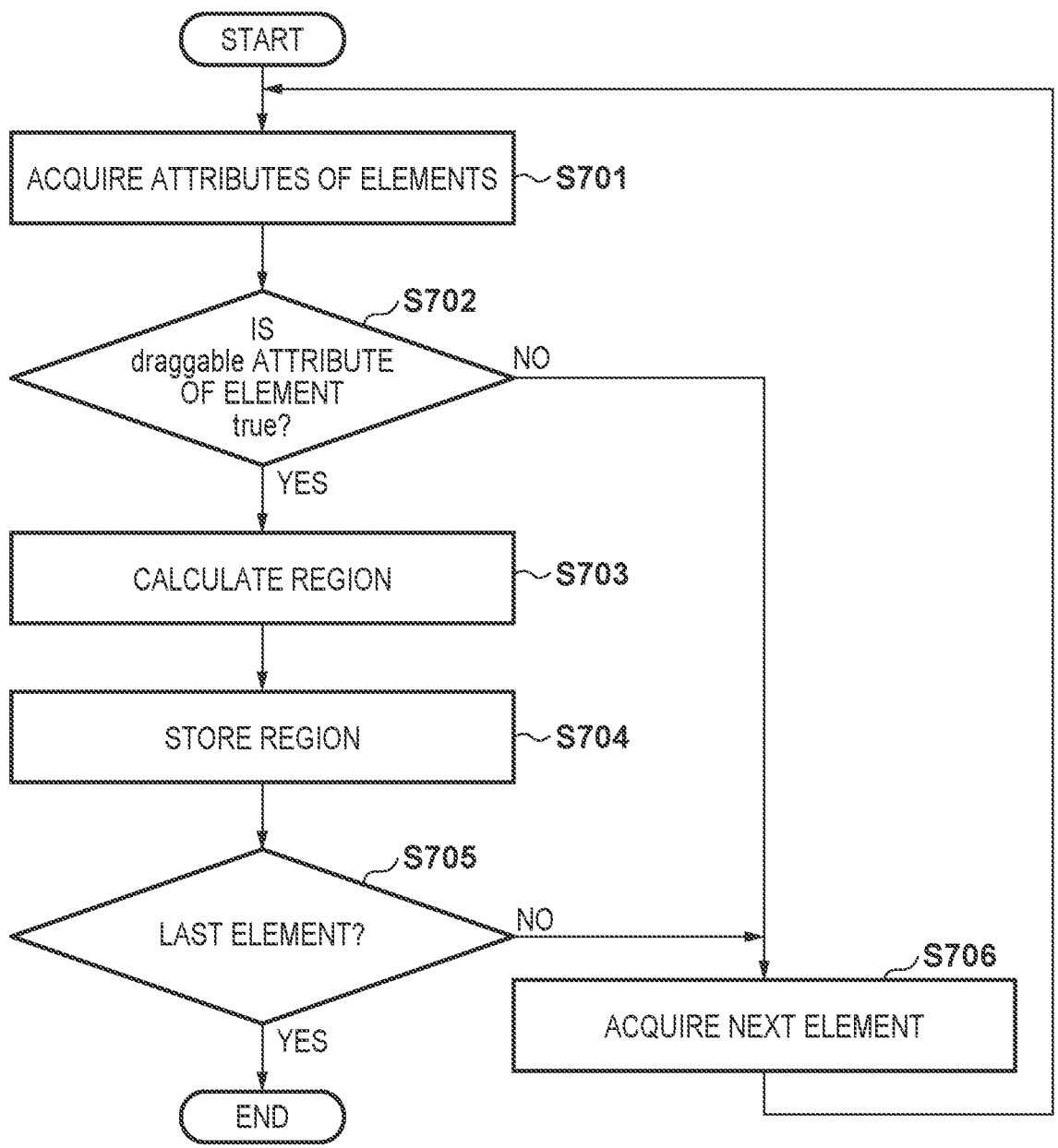
FIG. 7 is a flowchart illustrating a procedure of processes performed by the virtual machine according to the embodiment.

The virtual machine 401 determines whether the analyzed element is the last element (S705). If it is the last element, a series of processes in FIG. 7 is ended. If it is not the last element, the process proceeds to S706. The virtual machine 401 acquires the next element (S706). Thereafter, the process returns to S701, and the series of processes is repeated.

Figure 2:
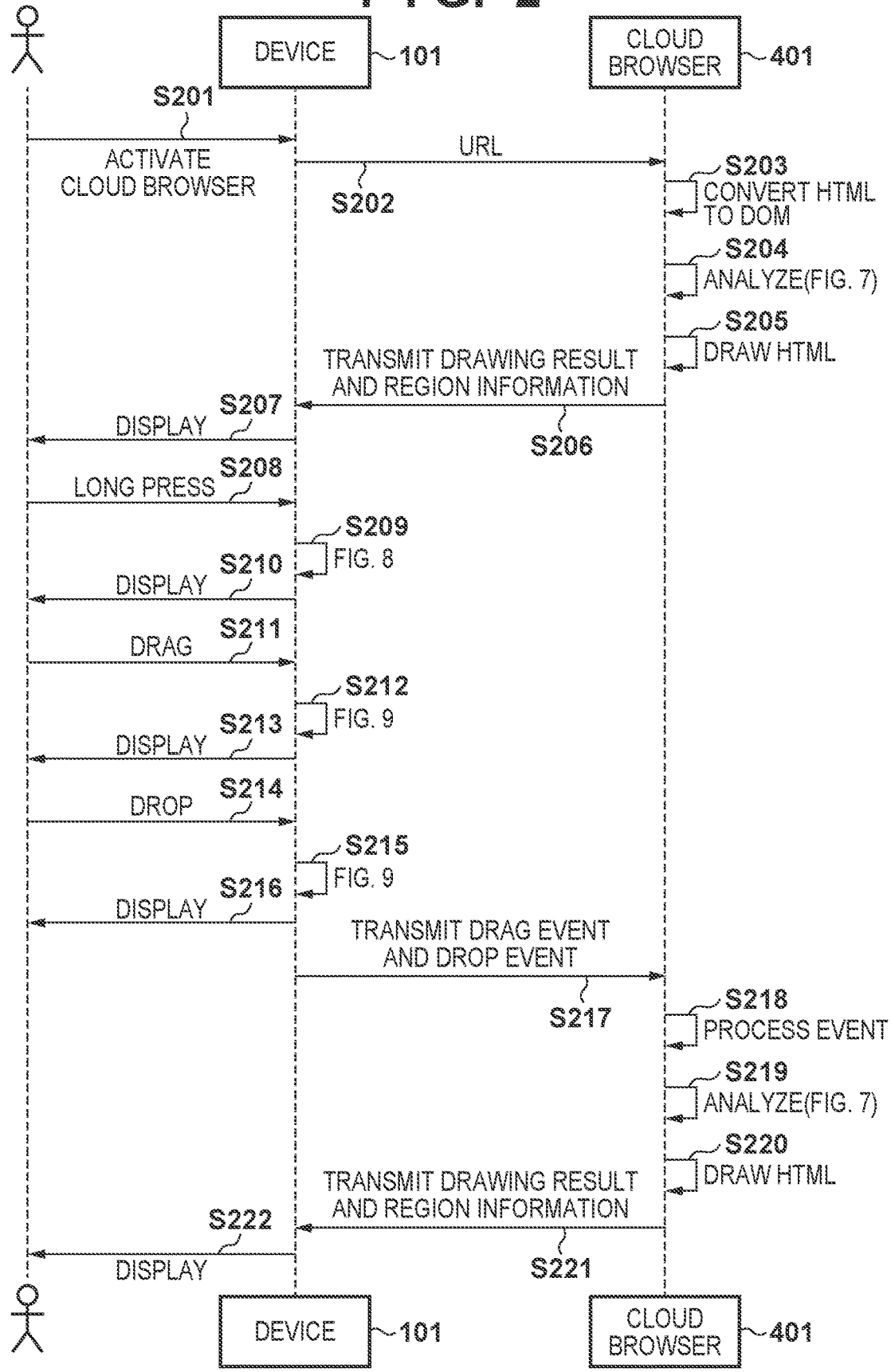
FIG. 2 is a sequence diagram illustrating processes performed by an information processing system according to the embodiment.
Figure 3:
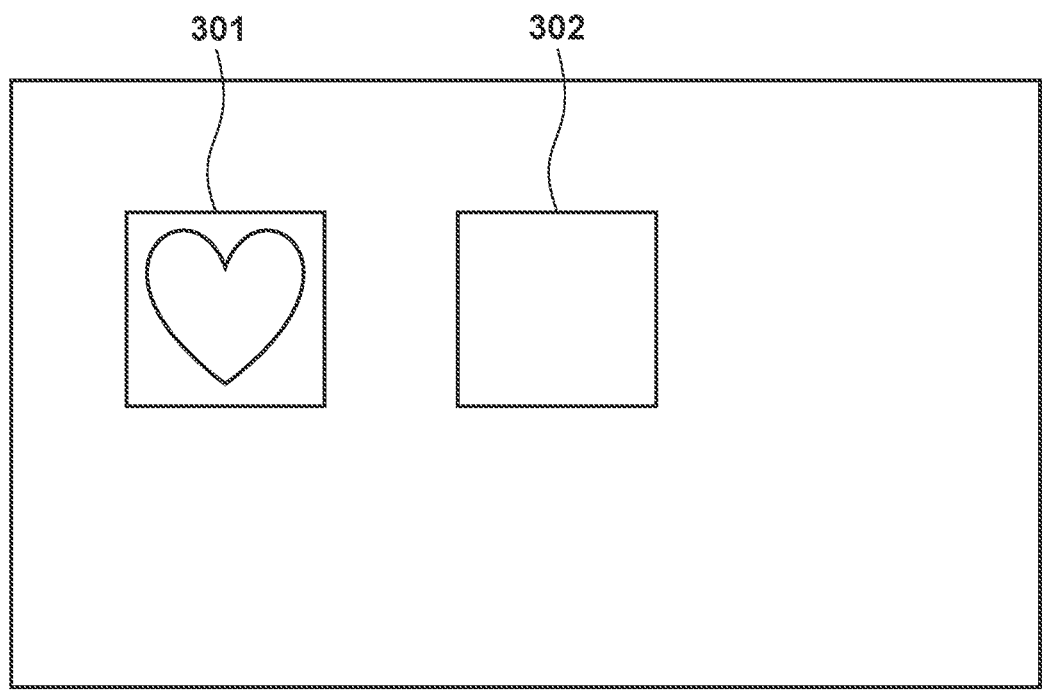
FIG. 3 is a diagram illustrating an example of a drawing result according to the embodiment.

After the process of FIG. 7, the process returns to FIG. 2, and the virtual machine 401 draws HTML data (S205). According to the HTML data in the present embodiment, as illustrated in FIG. 3, a heart-shaped image 301 arranged in a rectangle and a blank rectangle 302 are arranged side by side. The heart-shaped image is described by an <img> element, and in the <img> element, the draggable attribute is set to true by default. When the heart-shaped image 301 is dropped in the blank rectangle 302, the image is moved into the rectangle by JavaScript included in the HTML. A minimum rectangle including the heart-shaped image 301 corresponds to the region information. In the present embodiment, the format of the drawing result is a bitmap. However, the format may be JPEG or PNG.

The virtual machine 401 transmits the drawing result and the analysis information (region information) to the device 101 (S206). When there are a plurality of pieces of region information, all of the region information are transmitted. The device 101 stores the drawing result and the region information received via the network connection interface 107 in the RAM 103.

Then, the CPU 108 displays the drawing result on the display unit 106 (S207).

Subsequently, the user presses the display unit 106 functioning as a touch panel for a long time (S208). The device 101 executes a predetermined process (FIG. 8) in response to a user operation (S209).

<Processing of Device in S209>

Figure 8:
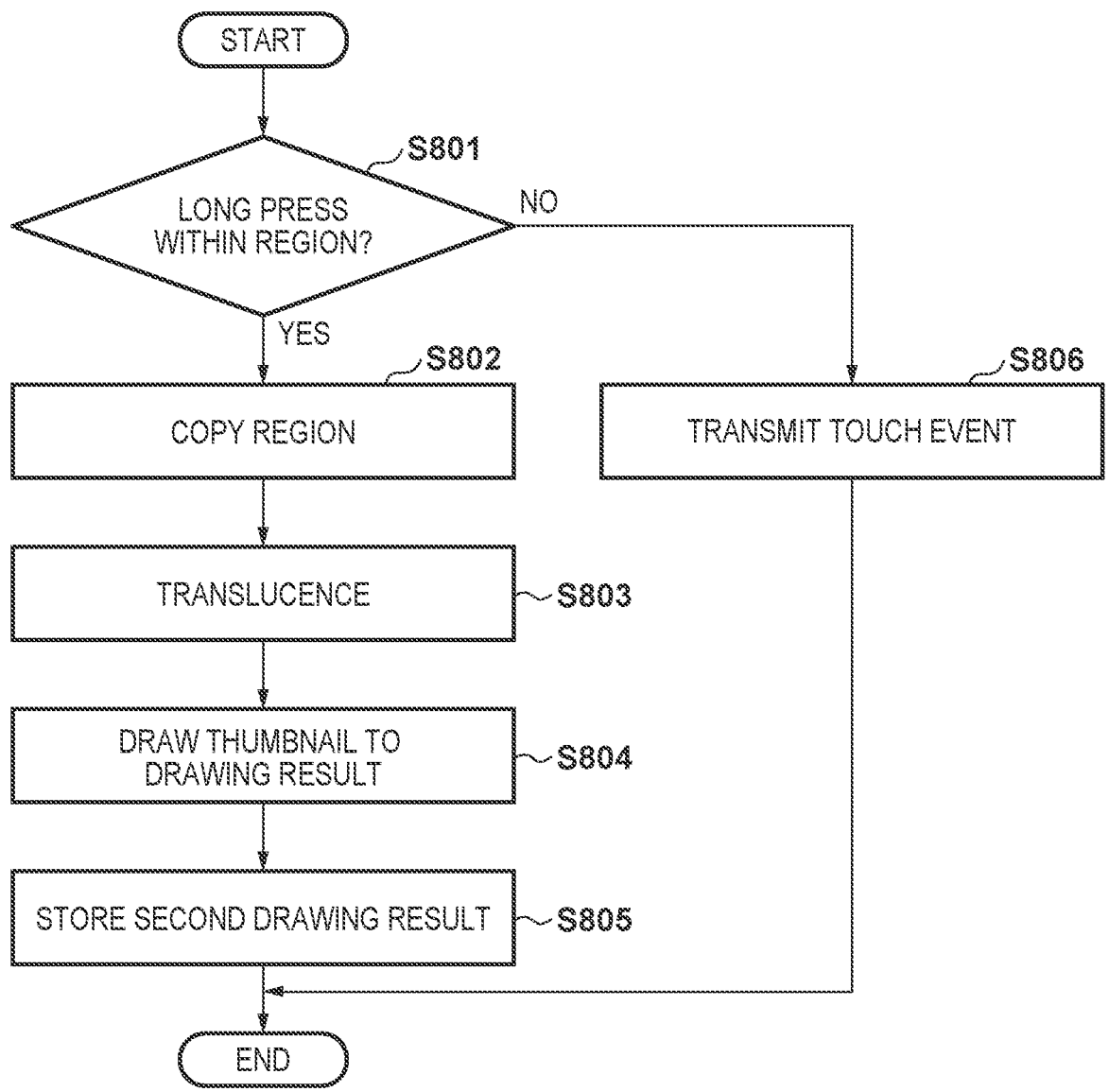
FIG. 8 is a flowchart illustrating a procedure of processes performed by the device at the time of the long press operation according to the embodiment.

Here, details of the process of S209 performed by the device 101 will be described with reference to the flowchart of FIG. 8. Information on the position and time at which the user has touched can be acquired from the input unit 105. The CPU 108 determines whether the user is pressing the region for a long time based on the region information read from the RAM 103 (S801). When the region is pressed for a long time, the process proceeds to S802. On the other hand, when the region is not pressed for a long time, the process proceeds to S806.

In the present embodiment, when the user's finger is touching the same position on the touch panel for longer than 200 ms, it is determined as a long press operation. The position and time at which the user has pressed for a long time are stored in the RAM 103. Thereafter, until S216, the process is performed on the device 101 side (that is, offline) without acquiring the information regarding the drawing process corresponding to the user operation from the virtual machine 401 (without acquiring the drawing result and the region information from the virtual machine 401 as in S206 or S221).

Figure 5:
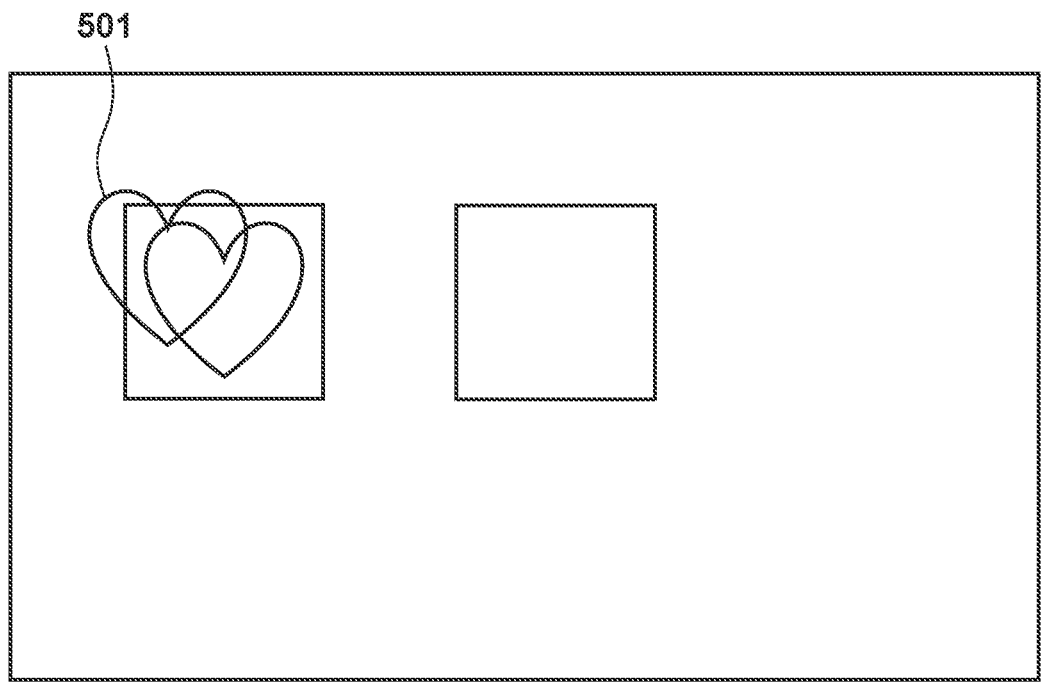
FIG. 5 is a diagram illustrating an example of a drawing result at the time of a long press operation according to the embodiment.

The CPU 108 reads the drawing result from the RAM 103 and copies the region portion (S802). The CPU 108 makes the copied part translucent, and generates a thumbnail image 501 as illustrated in FIG. 5 (S803). The thumbnail image 501 may be an icon image stored in the RAM 103 that does not depend on the drawing result.

The CPU 108 further draws the thumbnail image 501 in the drawing result based on the long pressing position, and generates and stores a second drawing result (S804). The second drawing result is as shown in, for example, FIG. 5. The CPU 108 stores the second drawing result in the RAM 103 (S805).

On the other hand, when determined in S801 that the long press operation is not performed in the region, the CPU 108 transmits information on the touch event to the virtual machine 401 (S806). The information of the touch event includes position and time information. The series of processes illustrated in FIG. 8 thus ends.

Referring back to FIG. 2, the CPU 108 displays the second drawing result on the display unit 106 (S210). Then, the user performs a drag operation (S211). The device 101 executes a predetermined process (FIG. 9) in response to a user operation (S212).

<Processing of Device in S212>

Figure 9:
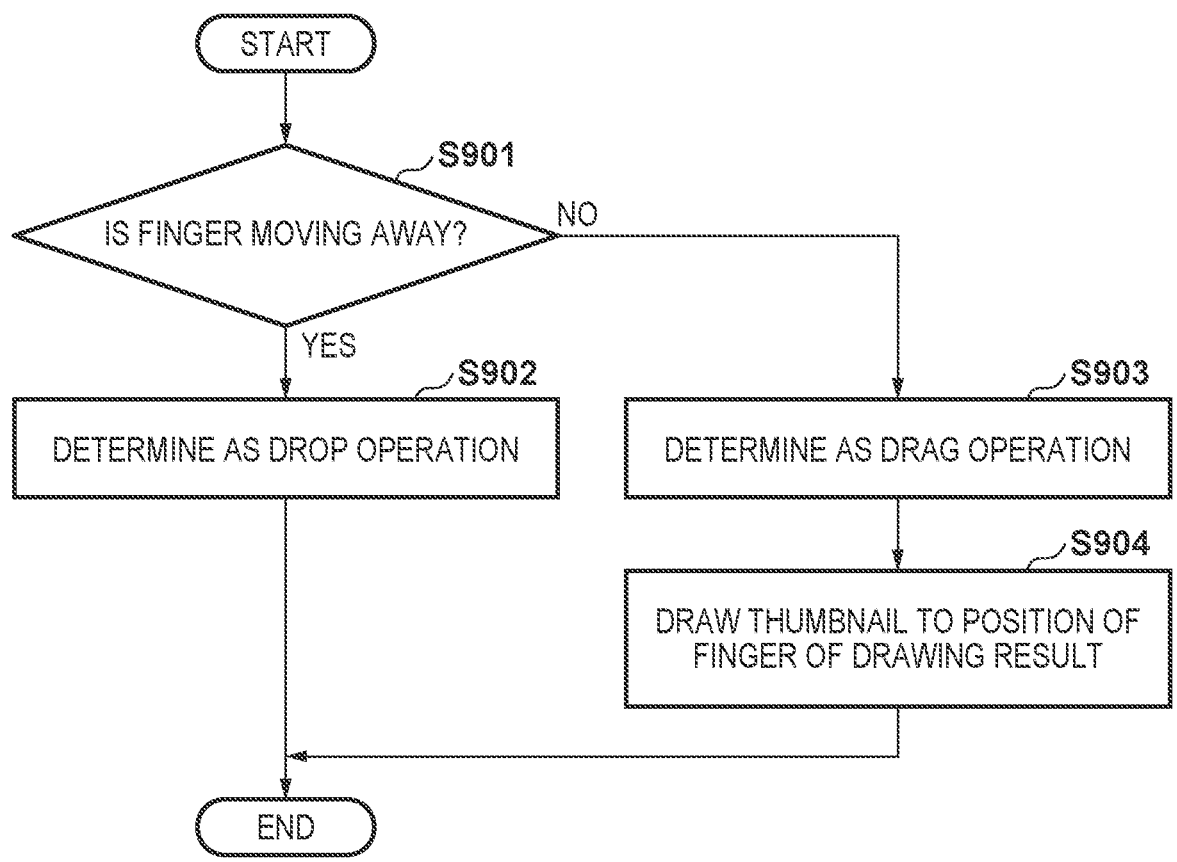
FIG. 9 is a flowchart illustrating a procedure of processes performed by the device at the time of drag operation according to the embodiment.

Here, details of the process of S212 performed by the device 101 will be described with reference to the flowchart of FIG. 9. The CPU 108 determines whether the user's finger has moved away from input unit 105 (S901). When determined that the user's finger has moved away, the process proceeds to S902. On the other hand, when determined that the user's finger has not moved away, the process proceeds to S905.

The CPU 108 determines that the operation is a drag operation if the user's finger has not moved away (S905). The position and time of the user's finger may be stored in the RAM 103.

Figure 10:
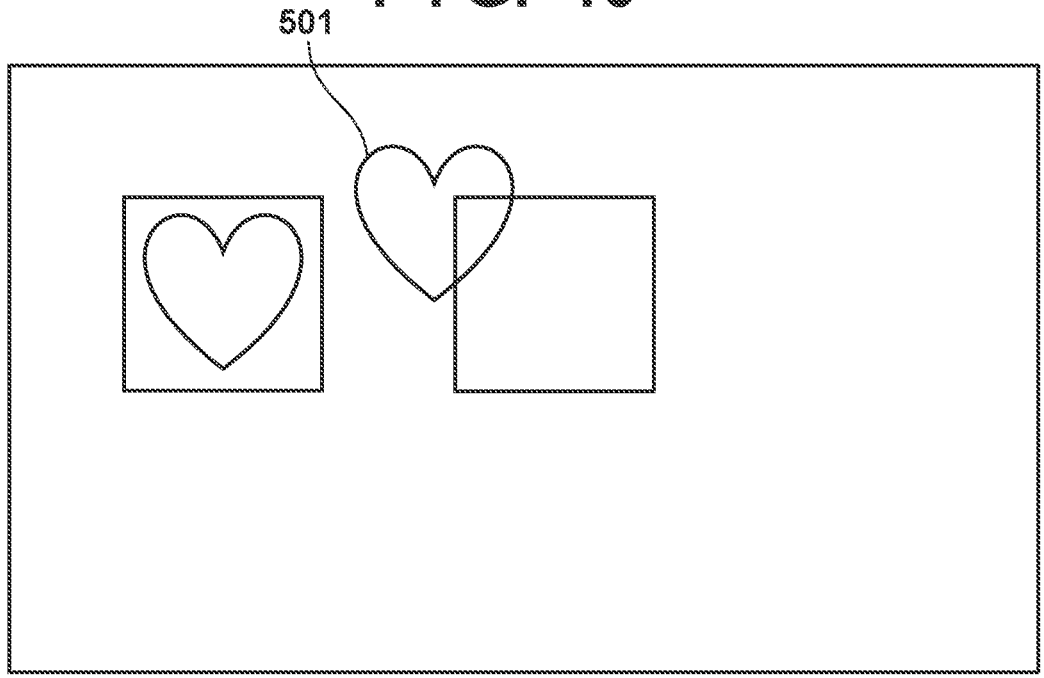
FIG. 10 is a diagram illustrating an example of a drawing result during dragging according to the embodiment.

The CPU 108 redraws the thumbnail image 501 based on the touched position so that the thumbnail image 501 follows the user's finger, and stores it in the RAM 103 as a third drawing result (S906). When the user drags the thumbnail image 501 toward the blank rectangle 302, the third drawing result is, for example, as illustrated in FIG. 10.

The CPU 108 determines that the operation is a drop operation if the finger has moved away (S902). The position and time at which the user has released his/her finger are stored in the RAM 103. The series of processes illustrated in FIG. 9 thus ends. Since the drag operation is performed in S212, the processes of S901, S903, and S904 are performed.

Referring back to FIG. 2, the CPU 108 displays the third drawing result on the display unit 106 (S213). Next, the user drops the thumbnail image 501 in the blank rectangle 302 (S214). The device 101 again executes a predetermined process (FIG. 9) in response to a user operation (S215). Details of the process of S215 performed by the device 101 are the processes described with reference to the flowchart of FIG. 9. Since the drag operation is performed in S215, the processes of S901 and S902 are performed. Then, the CPU 108 displays the drawing result on the display unit 106 (S216).

The CPU 108 transmits a drag start event and a drag end event to the virtual machine 401 through the network connection interface 107 (S217). The drag start event includes information on the position and time of long pressing by the user. The drag end event includes information on the position and time at which the user has released his/her finger. In addition, an in-dragging event may be transmitted. The in-dragging event includes information on the position and time at which the user has moved his/her finger.

Figure 6:
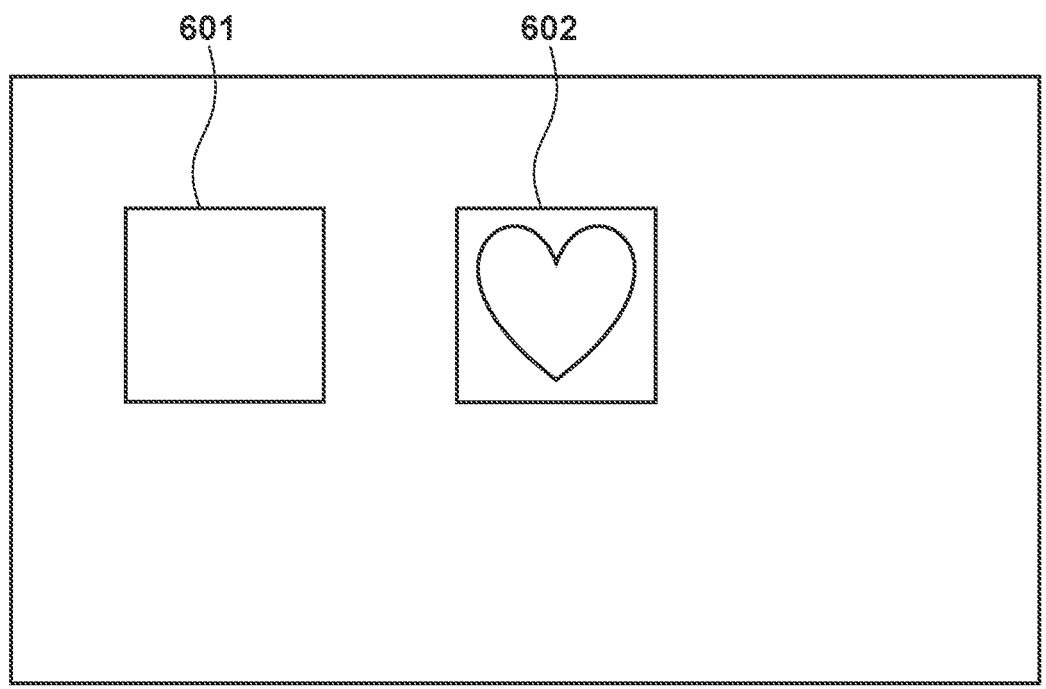
FIG. 6 is a diagram illustrating an example of a drawing result after event processing according to the embodiment.

The virtual machine 401 processes the drag start event and the drag end event received from the device 101 and reflects them in the DOM (S218). Then, the virtual machine 401 analyzes the elements along a tree structure (S219). The process of S219 is the same as the process described with reference to the flowchart of FIG. 7. The virtual machine 401 draws the HTML data (S220). The drawing result is, for example, as illustrated in FIG. 6 in which a blank rectangle 601 and a heart-shaped image 602 are arranged side by side.

The virtual machine 401 transmits the drawing result and the region information to the device 101 (S221). The device 101 stores the drawing result and the region information in the RAM 103. Furthermore, the CPU 108 displays the received drawing result on the display unit 106 (S222). The processes of FIG. 2 thus ends.

As described above, in the present embodiment, at the time of a predetermined operation (for example, drag & drop operation) in the device, the device side executes the drawing process, for example, an animation operation (a drag operation of causing the thumbnail image to follow the user's finger) without receiving information regarding the drawing process from the virtual machine functioning as the cloud browser.

As a result, the drawing process, for example, the animation operation is completed on the device side and thus is not affected by the communication speed, and the delay in the display to the user can be reduced. Therefore, the speed of the UI can be increased.

Variation Example

In the embodiment described above, the drag operation and the drop operation have been described as examples of the target predetermined user operation (particularly, S207 to S216). However, examples of the user operation are not limited thereto, and may be, for example, a pinch-in operation and a pinch-out operation.

Here, the pinch-in operation is an operation of moving two fingers as if to pinch something on the screen. On the other hand, the pinch-out operation is an operation of opening two fingers on the screen. Usually, the display can be reduced (the display range can be enlarged) by the pinch-in operation, and the display can be enlarged (the display range can be reduced) by the pinch-out operation.

In a case where the pinch-in operation or the pinch-out operation serves as the target, the entire drawn region is enlarged or reduced, and thus the process of FIG. 7 is not necessary, and the device 101 may execute enlargement/reduction corresponding to the pinch-in operation or the pinch-out operation using the drawing result received in S206. Even in the case of the pinch-in operation or the pinch-out operation, communication with the virtual machine 401 functioning as the cloud browser is unnecessary. Therefore, the speed of the UI can be increased.

According to the present invention, the delay in the display to the user can be reduced.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-143097, filed Sep. 8, 2022, which is hereby incorporated by reference herein in its entirety.

What is claimed is:

1. An information processing apparatus that communicates with a virtual machine functioning as a cloud browser, the information processing apparatus comprising:
    an acquisition unit configured to acquire, from the virtual machine, analysis information obtained by analyzing HTML data by the virtual machine and a drawing result obtained by drawing the HTML data by the virtual machine, wherein the analysis information is region information indicating a region for accepting a user operation on a screen of the information processing apparatus;
    a determination unit configured to determine the user operation on the screen of the information processing apparatus using the analysis information;
    a generation unit configured to generate a thumbnail image obtained by making the region translucent, from the drawing result using the analysis information; and
    a drawing unit configured to, when determined that the user operation is a predetermined user operation, execute a drawing process corresponding to an event corresponding to the user operation without acquiring information regarding the drawing process corresponding to the user operation from the virtual machine,
    wherein the predetermined user operation includes a drag operation for the region, and
    wherein the drawing unit draws an animation that causes the thumbnail image to follow the user's finger in accordance with the drag operation.

2. The information processing apparatus according to claim 1, wherein the region information indicates a region including an HTML element having a predetermined attribute.

3. The information processing apparatus according to claim 1, wherein the predetermined user operation includes a drop operation.

4. A method of controlling an information processing apparatus that communicates with a virtual machine functioning as a cloud browser, the method comprising:
    acquiring, from the virtual machine, analysis information obtained by analyzing HTML data by the virtual machine and a drawing result obtained by drawing the HTML data by the virtual machine, wherein the analysis information is region information indicating a region for accepting a user operation on a screen of the information processing apparatus;
    determining the user operation on the screen of the information processing apparatus using the analysis information;
    generating a thumbnail image obtained by making the region translucent, from the drawing result using the analysis information; and
    executing, when determined that the user operation is a predetermined user operation, a drawing process corresponding to an event corresponding to the user operation without acquiring information regarding the drawing process corresponding to the user operation from the virtual machine,
    wherein the predetermined user operation includes a drag operation for the region, and
    wherein the drawing process draws an animation that causes the thumbnail image to follow the user's finger in accordance with the drag operation.

5. A computer readable storage medium storing a program for causing a computer to execute a method of controlling an information processing apparatus that communicates with a virtual machine functioning as a cloud browser, the method comprising:
    acquiring, from the virtual machine, analysis information obtained by analyzing HTML data by the virtual machine and a drawing result obtained by drawing the HTML data by the virtual machine, wherein the analysis information is region information indicating a region for accepting a user operation on a screen of the information processing apparatus;
    determining the user operation on the screen of the information processing apparatus using the analysis information;
    generating a thumbnail image obtained by making the region translucent, from the drawing result using the analysis information, and executing, when determined that the user operation is a predetermined user operation, a drawing process corresponding to an event corresponding to the user operation without acquiring information regarding the drawing process corresponding to the user operation from the virtual machine, wherein the predetermined user operation includes a drag operation for the region, and wherein the drawing process draws an animation that causes the thumbnail image to follow the user's finger in accordance with the drag operation.

\* \* \* \* \*